United States Patent [19]

Kadlec et al.

[11] 4,039,442

[45] Aug. 2, 1977

[54] ION-EXCHANGE PROCESS FOR DESALTING WATER AND SUBSEQUENT REGENERATION OF THE ION EXCHANGERS

[75] Inventors: Vaclav Kadlec, Klanovice; Pavel Huebner, Prague, both of Czechoslovakia

[73] Assignee: CKD DUKLA, narodni podnik, Prague, Czechoslovakia

[21] Appl. No.: 679,375

[22] Filed: Apr. 22, 1976

Related U.S. Application Data

[63] Continuation of Ser. No. 534,438, Dec. 19, 1974, abandoned.

[51] Int. Cl.² .............................................. B01D 15/06
[52] U.S. Cl. ........................................ 210/32; 210/34
[58] Field of Search ............... 210/30 R, 32, 34, 37 R, 210/38 R, 38 A

[56] References Cited

U.S. PATENT DOCUMENTS

| | | | |
|---|---|---|---|
| 3,425,937 | 2/1969 | Weiss et al. | 210/32 |
| 3,679,580 | 7/1972 | Boari et al. | 210/32 |
| 3,716,481 | 2/1973 | Battaerd | 210/32 |

OTHER PUBLICATIONS

Kunin et al., *Ion Exchange Resins,* New York, John Wiley & Sons, Inc., 1950, pp. 26 & 27.

*Primary Examiner*—Thomas G. Wyse
*Assistant Examiner*—Ivars Cintins

[57] ABSTRACT

Water to be desalted in an ion-exchange process is contacted with a first cation exchanger in the form of a monovalent cation, and a first anion exchanger. The resultant treated solution is then reacted with a second, weakly acidic cation exchanger in the form of a free acid and, in certain applications, with a second weakly basic anion exchanger in the form of a free base to complete the desalting portion of the process. The second ion exchangers are then regenerated with the use of desalted water at a temperature greater than 30° C, and the products of such reaction (including a hydroxide of the monovalent cation) are employed to regenerate one or more of the remaining exhausted ion exchangers.

2 Claims, No Drawings

ION-EXCHANGE PROCESS FOR DESALTING WATER AND SUBSEQUENT REGENERATION OF THE ION EXCHANGERS

This is a continuation of application Ser. No. 534,438, filed Dec. 19, 1974, now abandoned.

BACKGROUND OF THE INVENTION

The invention concerns the desalting of solutions with the use of ion exchangers. It finds application principally in the desalting of water during the preparation of make-up water for steam generators, but is of general use in the energy generation and chemical industries.

The desalting of water is generally carried out by means of ion exchangers. In the first step of such processes in which the water is freed of cations, the solution is normally contacted by a strongly acidic cation exchanger in the form of hydrogen. After this, the anions of strong acids are removed by means of a weakly basic anion exchanger in the form of a free base. If desired, these two exchangers can be mixed together.

Desalting operations of this general type are often made reversible. The salts present in the water are first contacted with the strongly basic anion exchanger in the form of a hydroxide, a carbonate, or a hydrogen carbonate, and the corresponding hydroxide, carbonate, or hydrogen carbonate compounds resulting from such reaction are then neutralized by means of a weakly or strongly acidic cation exchanger in the form of hydrogen.

Theoretically, in such known processes ion exchangers need one equivalent of mineral acid and one equivalent of base (e.g., sodium hydroxide, ammonium hydroxide, or sodium carbonate), are necessary to remove equivalent of salt from the water. In practice, it has been found that for the removal of one equivalent of salt, 1.2-3 equivalents of mineral acid and 1.3-2 equivalents of base must be used. This drawback results in a high operating cost of the desalting process; moreover, it generates as a by-product waste water having a significant salt concentration. In fact, in such processes it has been found that for each equivalent of salt removed, approximately 1.5-4 equivalents units of neutral salts in addition are produced in the waste water. For these reasons much effort has been devoted to study of the methods of regenerating ion exchange resins by other means than those employing chemicals, for example, by heat energy (the so-called "Sirotherm process"), by electrical energy (electrodialysis), or mechanical energy (piezodialysis). But because of many technical problems resulting from the use of other than chemical means, none of these processes has been adapted to industry.

SUMMARY OF THE INVENTION

These disadvantages are eliminated by the use of an efficient and economical process in accordance with the invention for the desalting of water and the regeneration of the ion exchangers used therein. Illustratively, the solution to be desalted is brought into contact with a first cation exchanger in the form of a monovalent cation and the resulting solution is thereafter treated by a second weakly acidic cation exchanger in the form of a free acid or by the combination of such second cation exchanger and a weakly basic anion exchanger in the form of a free base to complete the desalting operation. (If desired, the initial stage of treatment with the first cation exchanger can be accompanied by a further contacting of the solution with an anion exchanger in the form of a hydroxide or of an anion of an acid having a dissociation constant smaller than $10^{-2}$).

After the desalting operation, the exhausted weakly acidic cation exchanger is hydrolytically regenerated by means of an aqueous fluid having a temperature greater than 30° C. At least one of the remaining ion exchangers is then regenerated by means of the hydroxide of the monovalent cation originating from the regeneration of the weakly acidic cation exchanger. If the weakly basic anion exchanges in the free base form is also used as an anion exchanger in the second step, the latter is also hydrolytically regenerated via an aqueous solution at a temperature greater than 30° C, and its reaction products are also employed to regenerate one or more of the other ion exchangers.

The process in accordance with the invention is particularly advantageous in that it results in low operating costs and in a minimal consumption of chemicals in the regeneration phrase. Moreover, the amount and salt concentration of the resulting waste water is minimized, and the effluent during regeneration is neutral so that the waste water does not have to be separately neutralized as in current processes.

During the regeneration step, the prevailing source for the regeneration is the relatively moderate amount of heat energy used in the hydrolytic regeneration of the weakly dissociated ion exchangers in the last stage.

ILLUSTRATIVE EXAMPLES OF THE INVENTION

The following examples illustrate some typical applications of the invention:

EXAMPLE 1

The water to be desalted is freed in a first stage from multivalent cations through a strongly acid cation exchanger in the form of sodium, and then is contacted by a second stage, i.e. a mixture of a strongly basic anion exchanger in the form of a hydroxide and a cation exchanger in the form of ammonium. The water treated by these first two stages contains only ammonium hydroxide in a concentration which corresponds to the original salt content of the untreated water. The water containing the ammonium hydroxide is neutralized through a third stage, i.e., through a weakly acidic cation exchanger in the form of a free acid. Such latter cation exchanger is therefore converted into the form of ammonium and the aqueous end product is completely desalted water.

After the ion exchange resins are exhausted, the regeneration process proceeds as follows: the third stage, i.e., the exhausted weakly acidic cation exchanger in the form of ammonium is regenerated with the use of desalted i.e., deionized water at a temperature of 80° – 150° C. In this way, such cation exchanger is changed back to the form of a free acid, while ammonium hydroxide is generated.

The ammonium hydroxide thus generated is conducted to the second stage, i.e., the mixture of the exhausted cation exchanger in the form of sodium and the strongly basic anion exchanger. The cation exchanger in the second stage is converted by means of the ammonium hydroxide from the form of sodium to the form of ammonium. The resultant sodium hydroxide regenerates the strongly basic anion exchanger. As a result, a mixture of sodium salts originates, such mixture being employed for the regeneration of the first stage having the strongly acid cation exchanger.

EXAMPLE 2

The water to be desalted is freed, in the first stage, of multivalent cations through a strongly acid cation exchanger in the form of ammonium. The water, now containing a mixture of ammonium salts, is conducted through the second stage, i.e., through a strongly basic anion exchanger in the bicarbonate form. The resulting solution of ammonium bicarbonate is conducted to the third stage, i.e., a weakly acid cation exchanger in the form of free acid. The weakly acid cation exchanger is converted here to the form of ammonium; and the carbon dioxide now present in the water is removed in a fourth stage, i.e., a weakly basic anion exchanger in the form of a free base. During such removal, such weakly basic anion exchanger is converted to the bicarbonate form of, and the end product is completely desalted water.

At the start of the regeneration portion of this process, the third stage, i.e., the weakly acid cation exchanger in the form of ammonium, is regenerated by means of water having a temperature of 80° – 150° C. The ammonium hydroxide arising from such heat regeneration of the weakly acid cation exchanger is, after cooling, reacted with the fourth stage, i.e. the exhausted weakly basic anion exchanger now in the bicarbonate form of. The resulting solution of ammonium bicarbonate regenerates both the second stage (i.e. the strongly basic anion exchanger which is converted back to bicarbonate form), and the first stage (i.e., the strongly acid cation exchanger which is converted back to the form of ammonium). The third and fourth stages, i.e., the weakly acid cation exchanger and the weakly basic anion exchanger, can be joined in one stage in a mixed-bed. During exhausting cycle, such mixture serves to remove the ammonium bicarbonate, and in turn during regeneration the mixture constituants are regenerated by means of desalted water at a temperature of 60° – 80° C. The result of this latter heat regeneration is again a solution of ammonium biocarbonate after cooling, which is then employed to regenerate the previous stages (i.e., the strongly acid cation exchanger and the strongly basic anion exchanger).

EXAMPLE 3

The salt content of the water to be treated is first converted to sodium bicarbonate by means of a combination of a strongly acid cation exchanger in the form of sodium and a strongly basic anion exchanger in the bicarbonate form. Such sodium bicarbonate is removed by means of a weakly acid cation exchanger in the form of a free acid. The resulting treated water is, by degasifier, liberated of free carbon dioxide, which is conducted to a container of ammonium hydroxide to form ammonium bicarbonate.

The ion exchanger regeneration takes place in two stages:

In the first stage of the regeneration, the weakly acid cation exchanger in the form of sodium is re-converted to ammonium form by the ammonium bicarbonate solution. The resulting solution of sodium hydrogen carbonate regenerates the earlier stages, (i.e., the strongly basic anion exchanger and the strongly acid cation exchanger).

In the second stage of the regeneration, the weakly acid cation exchanger in the form of ammonium is regenerated by means of desalted water at a temperature of 80° – 150° C to form a free acid form, and the now-liberated ammonium hydroxide remains in the container for the next exhausting cycle and regeneration.

If the first strongly acidic cation exchanger works in ammonium instead of sodium form, the weakly acid cation exchanger removes the ammonium bicarbonate. With the use of of concentrated ammonium hydrogen carbonate from the storage container, the two first stages (i.e., the strongly basic anion exchanger and the strongly acid cation exchanger) are directly regenerated.

EXAMPLE 4

The water is conducted through a first stage consisting by a strongly acid cation exchanger in the form ammonium. The treated water with the resulting mixture of ammonium salts flows through a weakly basic anion exchanger in the bicarbonate form in the second stage, and the thus generated ammonium bicarbonate is contacted by a weakly acid cation exchanger in the form of a free acid in the third stage. The resulting carbon dioxide is removed in the fourth stage by means of a weakly basic anion exchanger in the form of a free base.

During regeneration, the weakly acid cation exchanger in the third stage is regenerated with the use of water having a temperature of 80° – 150° C to form ammonium hydroxide. The latter regenerates the exhausted weakly basic anion exchanger in the second stage, and the strongly acid cation exchanger in the first stage is regenerated with the ammonium salts wasted for the second stage. The weakly basic anion exchanger in the fourth stage, which after exhaustion is in the bicarbonate form, is reversed in the second stage. On the contrary the regenerated weakly basic anion exchanger in the second stage is after regeneration in the form of a free base and thereby functions as the fourth stage in the following exhausting cycle. In this way, the weakly basic anion exchangers in the second and fourth stages alternate constantly.

In the foregoing, the invention has been described in connection with illustrative sequences of steps thereof. Many variations and modifications will now occur to those skilled in the art. It is accordingly desired that the scope of the appended claims not be limited to the specific disclosure herein contained.

What is claimed is:

1. In a method for the desalting of a solution by means of ion exchangers followed by the regeneration of the exhausted ion exchangers after the desalting is completed, comprising contacting the solution with a first strong cation exchanger in the form of a monovalent cation selected from the group consisting of sodium and ammonium and by a first strong anion exchanger selected from the group consisting of a hydroxide and a bicarbonate to replace the salts in the solution by a first basic compound and to exhaust the first cation exchanger and the first anion exchanger, and thereafter contacting the solution with a second weak cation exchanger having a pk value greater than 2 in the form of a free acid to replace the cation of the first compound with a hydrogen ion of the second cation exchanger and to exhaust the second cation exchanger, the improvement which comprises the further steps of contacting the exhausted second cation exchanger with deionized water having a temperature greater than 30° C to produce a second basic compound and to directly regenerate the second cation exchanger, and thereafter contacting the exhausted first anion exchanger with the second basic compound to directly regenerate the first anion exchanger.

2. A method as defined in claim 1, comprising the further step, following the contacting of the solution with the second cation exchanger, of contacting the solution with a second weak anion exchanger in the form of a free base.

* * * * *